US012591408B2

(12) United States Patent
Nilsson et al.

(10) Patent No.: US 12,591,408 B2
(45) Date of Patent: Mar. 31, 2026

(54) DISPLAY APPARATUS AND METHOD INCORPORATING INTEGRATED SPEAKERS WITH ADJUSTMENTS

(71) Applicant: Varjo Technologies Oy, Helsinki (FI)

(72) Inventors: Anna Nilsson, Helsinki (FI); Oliver Merilaid, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 139 days.

(21) Appl. No.: 18/518,577

(22) Filed: Nov. 23, 2023

(65) Prior Publication Data

US 2025/0173118 A1 May 29, 2025

(51) Int. Cl.
| | |
|---|---|
| *G06F 3/16* | (2006.01) |
| *G06F 3/01* | (2006.01) |
| *G06F 21/32* | (2013.01) |
| *G06V 40/16* | (2022.01) |

(52) U.S. Cl.
CPC .............. *G06F 3/165* (2013.01); *G06F 3/013* (2013.01); *G06F 21/32* (2013.01); *G06V 40/161* (2022.01)

(58) Field of Classification Search
CPC .......... G06F 3/165; G06F 3/013; G06F 21/32; G06V 40/161; H04R 5/04; H04R 2225/41; H04R 2430/01; H04R 2499/15; H04R 1/1041
See application file for complete search history.

(56) References Cited

U.S. PATENT DOCUMENTS

| | | | | |
|---|---|---|---|---|
| 4,997,056 A | * | 3/1991 | Riley ...................... A61F 11/30 |
| | | | | 181/129 |
| 2008/0044052 A1 | * | 2/2008 | Whipple ................ H04R 1/105 |
| | | | | 381/376 |
| 2021/0112361 A1 | * | 4/2021 | Mindlin ................... H04S 7/303 |
| 2023/0058427 A1 | * | 2/2023 | Pakarinen ........ G10K 11/17837 |
| 2023/0353678 A1 | * | 11/2023 | Jia .......................... H04M 3/568 |
| 2024/0078079 A1 | * | 3/2024 | Carrigan ............. G06F 3/04883 |

* cited by examiner

*Primary Examiner* — Phung-Hoang J Nguyen
(74) *Attorney, Agent, or Firm* — Ziegler IP Law Group, LLC.

(57) ABSTRACT

Disclosed is a display apparatus including at least one speaker per ear; at least one sensor; and at least one processor coupled to the at least one speaker and the at least one sensor. The at least one processor is configured to receive, from the at least one sensor, sensor data indicative of a usage context of the display apparatus; process at least the received sensor data to determine the usage context; and adjust a value of at least one audio parameter for the at least one speaker, based on the determined usage context.

13 Claims, 4 Drawing Sheets

DISPLAY APPARATUS AND METHOD INCORPORATING INTEGRATED SPEAKERS WITH ADJUSTMENTS

TECHNICAL FIELD

The present disclosure relates to display apparatuses. Moreover, the present disclosure relates to methods incorporating integrated speakers with adjustments.

BACKGROUND

In recent times, use of display devices in extended reality (XR) applications has significantly increased, where said display devices are often required to provide audio to a user, such as system notification sounds or audio related to the XR applications. Although, parameters related to the audio that needs to be provided to the user needs to be customized based on a situation in which said display devices are being used. For example, volume levels of the audio needs to be different when said display devices are kept on a table in comparison to the volume levels of the audio when said display devices are worn by the user.

However, present solutions related to said display devices fail to provide a way to customize the parameters related to the audio that is provided to the user according to the situation in which said display devices are being used. Although, there are some solutions that detect when said display devices are connected to external audio devices, yet such solutions fail to detect other situations according to which the parameters related to the audio that is to be provided to the user needs to be customized.

Therefore, in light of the foregoing discussion, there exists a need to overcome the aforementioned drawbacks.

SUMMARY

The aim of the present disclosure is to provide a display apparatus and a computer-implemented method to effectively make adjustments in integrated speakers based on usage context. The aim of the present disclosure is achieved by a display apparatus and a method that incorporates integrated speakers with adjustments defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
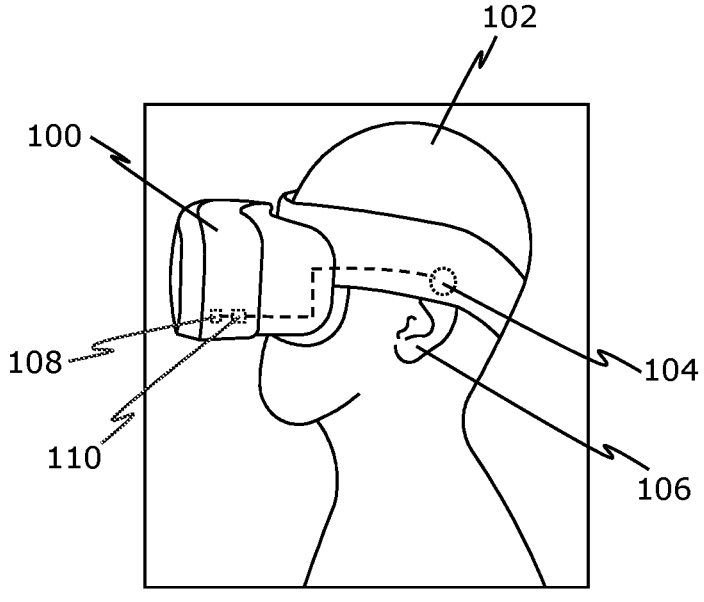
FIG. 1 is a schematic illustration of a display apparatus, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a display apparatus comprising:

- at least one speaker per ear;
- at least one sensor; and
- at least one processor coupled to the at least one speaker and the at least one sensor, wherein the at least one processor is configured to:
    - receive, from the at least one sensor, sensor data indicative of a usage context of the display apparatus;
    - process at least the received sensor data to determine the usage context; and
    - adjust a value of at least one audio parameter for the at least one speaker, based on the determined usage context.

The present disclosure provides an aforementioned display apparatus. The at least one processor is able to accurately determine the usage context of the display apparatus. Thus, the at least one processor is able to effectively adjust the at least one audio parameter for the at least one speaker in an automated manner, based on the determined usage context, which significantly enhances a user experience of using the display apparatus. Moreover, the display apparatus successfully provide an immersive experience to the user of the display apparatus for a wide range of scenarios involving different types of usage contexts of the display apparatus.

In a second aspect, the present disclosure provides a computer-implemented method comprising:

- receiving, from at least one sensor, sensor data indicative of a usage context of a display apparatus;
- processing at least the received sensor data for determining the usage context; and
- adjusting a value of at least one audio parameter for at least one speaker per ear of the display apparatus, based on the determined usage context.

The present disclosure provides an aforementioned method. The method is able to accurately determine the usage context of the display apparatus. Thus, method is able to effectively adjust the at least one audio parameter for the at least one speaker in an automated manner, based on the determined usage context, which significantly enhances a user experience of using the display apparatus. Moreover, the method enables the display apparatus to successfully provide an immersive experience to the user of the display apparatus for a wide range of scenarios involving different types of usage contexts of the display apparatus.

Throughout the present disclosure, the term "display apparatus" refers to specialized equipment that is configured to present an extended-reality (XR) environment to a user when the display apparatus in operation is worn by the user on his/her head. In such an instance, the display apparatus acts as a device (for example, such as an XR headset, a pair of XR glasses, and the like) that is operable to present a visual scene of the XR environment to the user.

Throughout the present disclosure, the term "speaker" refers to a transducer device that converts electrical signals (typically, audio signals), into sound waves that are audible. It will be appreciated that the speaker is well-known in the art. Herein, for each ear of the user one or more speakers are present in the display apparatus. It will be appreciated that the "at least one speaker" refers to "one speaker" in some implementations and "plurality of speakers" in other implementations. Notably, the at least one speaker per ear is configured to provide audio to the user associated with the XR environment being presented to the user via the display apparatus. Optionally, the at least one speaker is integrated with the display apparatus using one of: the at least one speaker being a part of the display apparatus, the at least one speaker removably coupled to the display apparatus, the at least one speaker moveably coupled to the display apparatus, and the like.

Throughout the present disclosure, the term "sensor" refers to a device that senses data which is indicative of the usage context of the display apparatus. It will be appreciated that the term "at least one sensor" refers to "one sensor" in some implementations, and "a plurality of sensors" in other implementations.

Optionally, the at least one sensor comprises at least one of: a face tracking means, an eye tracking means, a proximity sensor, a display apparatus-tracking means, a biometric authentication means, a microphone, a peripheral connectivity sensor. Throughout the present disclosure, the term "face tracking means" refers to that sensing device which detects and tracks a position and/or an orientation of user's face to detect if the user's face is in a proximity of the display apparatus, which indicates whether the display apparatus is worn by the user or not worn by the user. Throughout the present disclosure, the term "eye tracking means" refers to that sensing device which detects and tracks a position and/or an orientation of user's eyes to detect if the user is in the proximity of the display, which indicates whether the display apparatus is worn by the user or not worn by the user. Throughout the present disclosure, the term "proximity sensor" refers to that sensing device which detects and measures changes in the proximity of an area in which the proximity sensor is arranged. Notably, the proximity sensor detects whether or not the user is in the proximity of the display apparatus as the proximity sensor is arranged in the display apparatus, which indicates whether the display apparatus is worn by the user or not worn by the user. Throughout the present disclosure, the term "display apparatus-tracking means" refers to that sensing device which tracks a position and/or an orientation of the display apparatus. Notably, the display apparatus-tracking means tracks data which indicates whether the display apparatus is moving or stationary. Throughout the present disclosure, the term "biometric authentication means" refers to that sensing device which verifies and authenticates an identity of a given person via personal biological information of the given person (such as a fingerprint, a retinal scan, an iris scan and the like). Notably, the biometric authentication means verify and authenticate which user is using the display apparatus. Throughout the present disclosure, the term "microphone" refers to that sensing device which senses sound waves and converts them into electrical signals. Notably, the microphone detects sound signals around the display apparatus which indicates how much ambient noise is present in the environment in which the display apparatus is used. Throughout the present disclosure, the term "peripheral connectivity sensor" refers to that sensing device having a software and a hardware component that detects whether or not the display apparatus is connected to a peripheral device. The hardware component of the peripheral connectivity sensor is arranged within the display apparatus or the peripheral device connected to the display apparatus, wherein the hardware component detects presence of a physical connection between the display apparatus and the peripheral device. For example, the hardware component is a USB port sensor for detecting a USB connection between the display apparatus and the peripheral device, or the hardware component is a bluetooth radio sensor for detecting a bluetooth connection between the display apparatus and the peripheral device. Moreover, the software component is arranged in the display apparatus for interpreting signals from the hardware component and for managing connectivity between the display apparatus and the peripheral device. The software component comprises drivers, protocols and software libraries for handing communication with the peripheral device. A technical effect of the at least one sensor comprising at least one of: the face tracking means, the eye tracking means, the proximity sensor, the display apparatus-tracking means, the biometric authentication means, the microphone, the peripheral connectivity sensor, is that the at least one sensor is able to sense data for indicating a wide range of different usage contexts of the display apparatus.

Throughout the present disclosure, the term "processor" refers to a computational element that is operable to execute instructions in the display apparatus. It will be appreciated that the term "at least one processor" refers to "one processor" in some implementations, and "a plurality of processors" in other implementations. Examples of the at least one processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the at least one processor may refer to one or more individual processors, processing devices and various elements associated with a processing device that may be shared by other processing devices. Additionally, one or more individual processors, processing devices and elements are arranged in various architectures for responding to and processing the instructions that execute the instructions in the display apparatus. Notably, the at least one processor is operatively coupled to the at least one speaker that enables the at least one processor to control an operation of the at least one speaker to adjust the value of the at least one parameter. Notably, the at least one processor is communicably coupled to the at least one sensor that enables the at least one processor to receive the sensor data. Optionally, the at least one processor is communicably coupled to the at least one sensor via one of: a cellular network, a bluetooth module, a Wi-Fi module, and the like.

Throughout the present disclosure, the term "usage context" refers to a specific mode or a manner in which the display apparatus is used by the user. Optionally, the usage context is at least one of: whether or not the display apparatus is worn by a user, whether or not the display apparatus is stationary, an identity of the user of the display apparatus, a measure of ambient noise in an environment where the display apparatus is used, whether or not the display apparatus is connected to external speakers. In this regard, the usage context being whether or not the display apparatus is worn by the user implies that either the usage context is that the display apparatus is worn by the user, or the usage context is that the display apparatus is not worn by the user (for example, the display apparatus is kept on a table away from the user). Notably, the usage context being whether or not the display apparatus is worn by the user is determined based on the sensor data of the at least one of: the face tracking means, the eye tracking means, the proximity sensor, the display apparatus-tracking means. The usage context being whether or not the display apparatus is stationary implies that either the usage context is that the display apparatus is stationary at one fixed position and/or orientation, or the usage context is that the display apparatus is not stationary (i.e., moving) from one position and/or orientation to another position and/or orientation. Notably, the usage context being whether or not the display apparatus is stationary is determined based on the sensor data of at least the display apparatus-tracking means. The usage context being the identity of the user of the display apparatus implies that the usage context relates to which user is using the display apparatus in an implementation where there may be multiple users of the display apparatus. Notably, the usage context being the identity of the user is determined based on the sensor data of the biometric authentication means. The usage context being the measure of ambient noise in the environment where the display apparatus is used implies that the usage context relates to detecting how much ambient noise (i.e., unwanted background noise) is present in the environment in which the display apparatus is used. Notably, the usage context being the measure of ambient noise in the environment where the display apparatus is used is determined based on the sensor data of the microphone. The usage context being whether or not the display apparatus is connected to the external speakers (i.e., the peripheral device) is determined based on the sensor data of the peripheral connectivity sensor. A technical effect is that the display apparatus is suitable to be used in a wide range of different usage contexts.

For example, the usage context of the display apparatus is that the display apparatus is being worn by the user. Alternatively, in another example, the usage context of the display apparatus is that the display apparatus is not worn by the user. Notably, for each different usage context of the display apparatus, the at least one audio parameter for the at least one speaker needs to be adjusted differently. Throughout the present disclosure, the term "sensor data" refers to that data which is collected by the at least one sensor. Notably, the sensor data is indicative of the usage context of the display apparatus as the sensor data is collected for the properties or attributes that are related to the usage context of the display apparatus. For example, the sensor data comprises data about no person detected in a close proximity of the display apparatus which indicates that the display apparatus is not worn by the user.

It will be appreciated that the usage context is determined by processing at least the received sensor data as the received sensor data is indicative of the usage context of the display apparatus. Notably, in some implementations, the at least one processor processes only the received sensor to determine the usage context, while in other implementations the at least one processor processes additional information that is indicative of the usage context along with the received sensor data. Herein, to process at least the received sensor data, the at least one processor analyses information of the properties or attributes related to the usage context present in at least the received sensor data, and subsequently, determine a certain mode or manner in which the display apparatus is operated by the user to determine the usage context. For example, the at least one processor processes the data that no person is detected in the close proximity of the display apparatus to determine that the usage context is that the display apparatus is not worn by the user.

Optionally, the at least one processor is further configured to:

receive a user input indicative of the usage context; and process the received user input to determine the usage context.

In this regard, the user input is provided via an interactive user interface provided on the display apparatus or a user device that is communicably coupled to the display apparatus. Notably, the usage context that can be indicated via the user input is one of: the identity of the user, whether or not the display apparatus is connected to the external speakers. For example, the received user input may be login information of the user which indicates the identity of the user. A technical effect is that the usage context can also be determined without any sensor data.

Throughout the present disclosure, the term "audio parameter" refers to a parameter associated with a certain property or attribute of the audio that is provided to the user via the at least one speaker per ear. Optionally, the audio that is provided to the user is one of: a system notification sound of the display apparatus, an audio signal related to XR applications, audio signals related to non-XR applications, for which the display apparatus is used. It will be appreciated that the term "at least one audio parameter" refers to "one audio parameter" in some implementations, and "a plurality of audio parameters" in other implementations. Optionally, the at least one audio parameter is at least one of: an audio volume, an audio frequency response, an audio leakage cancellation setting, an audio channel balance, an audio profile, an audio filtering setting, a hearing impairment correction setting, an audio phase setting. In this regard, the term "audio level" refers to a level of loudness of the audio that is provided to the user. Throughout the present disclosure, the term "audio frequency response" refers to an output magnitude and phase as a function of input frequency. Throughout the present disclosure, the term "audio leakage cancellation setting" refers to that audio setting which determines if the audio leakage cancellation is enabled for the audio provided to the user or not. Throughout the present disclosure, the term "audio channel balance" refers to a relative volume level or intensity between left and right channels of the audio that is provided to the user. Throughout the present disclosure, the term "audio profile" refers to a set of customized audio settings determined for a given user of the display apparatus, as the display apparatus may be used by multiple users. Throughout the present disclosure, the term "audio filtering setting" refers to that audio setting that alters frequency response of the audio that is provided to the user, via audio filters (such as low pass filter, high pass filter, band pass filter, and the like). Throughout the present disclosure, the term "hearing impairment correction setting" refers to a set of audio settings related to the audio that is provided to the user in a scenario when the user has hearing impairment issues. Notably, the hearing impairment comprises one or more audio parameters from amongst aforementioned at least one audio parameter. Throughout the present disclosure, the term "audio phase setting" refers to a phase angle of the audio that is provided to the user. A technical effect of the at least one audio parameter being one of: the audio volume, the audio frequency response, the audio leakage cancellation setting, the audio channel balance, the audio profile, the audio filtering setting, the hearing impairment correction setting, the audio phase setting, is that the a significantly high number of properties or attributes associated with the audio that is provided to the user can be adjusted based on the usage context of the display apparatus, which enhances a user experience of using the display apparatus.

Notably, for every different usage context of the display apparatus, the audio that is provided to the user needs to be adjusted differently. Subsequently, by adjusting the value of the at least one audio parameter, the audio that is provided to the user is adjusted. Herein, the coupling of the at least one processor to the at least one speaker enables the at least one processor to adjust the value of the at least one audio parameter for the at least one speaker. It will be appreciated that adjusting the value of the at least one audio parameter for the at least one speaker, based on the determined usage context effectively enhances the user experience of using the display apparatus.

Optionally, when adjusting the value of the at least one audio parameter for the at least one speaker, based on the usage context, the at least processor is configured to perform at least one of:

set an audio volume to a first volume lying in a first range, when the usage context is that the display apparatus is worn by the user;

set the audio volume to a second volume lying in a second range, when the usage context is that the display apparatus is not worn by the user;

disable the audio leakage cancellation setting, when the usage context is that display apparatus is not worn by the user;

enable the audio leakage cancellation setting, when the usage context is that display apparatus is worn by the user;

adjust the audio frequency response according to a first equalization setting, when the usage context is that the display apparatus is worn by the user;

adjust the audio frequency response according to a second equalization setting, when the usage context is that the display apparatus is not worn by the user;

set the value of the at least one audio parameter according to a user's preference, when the usage context indicates the identity of the user of the display apparatus;

set the value of the at least one audio parameter according to a current pose of the at least one speaker with respect to the user's ear, wherein the at least one speaker is capable of attaining at least one pose with respect to the user's ear, when the usage context is that the display apparatus is worn by the user and the usage context indicates a measure of ambient noise in an environment where the display apparatus is used;

set the audio volume of the at least one speaker to zero, when the usage context is that the display apparatus is connected to external speakers.

In this regard, when the usage context is that the display apparatus is worn by the user, a position of the at least one speaker per ear is in a close proximity to the respective ear of the user because of which the user can hear the audio from the at least one speaker per ear at a lower level of the audio volume in comparison to an average predefined level of the audio volume. Subsequently, the audio volume is set to the first volume which is lower than the average predefined level of the audio volume. Notably, the first volume is selected from the first range, where the first range is a range of audio volumes that are lower than the average predefined audio volume. The first range comprises of those audio volumes that are based on audio safety limits to protects the user's ears from hearing impairment. For example, the first range is selected according to IEC62368-1 standard. Similarly, when the usage context is that the display apparatus is not worn by the user, the position of the at least one speaker per ear is far away from the respective ear of the user because of which the user can hear the audio from the at least one speaker per ear only at a higher level of the audio volume in comparison to the average predefined level of the audio volume. Subsequently, the audio volume is set to the second volume which is higher than the average predefined level of the audio volume. Notably, the second volume is selected from the second range, where the second range is a range of audio volumes that are higher than the average predefined audio volume. The second range comprises of audio volumes as high as possible to enable the user to hear the audio from the at least one speaker from a far distance, when the display apparatus is not worn by the user.

Optionally, when the usage context is that the display apparatus is not worn by the user, then the audio from the at least one speaker needs to propagate in all possible directions for the audio to reach the user's ears. Subsequently, the audio leakage cancellation setting is disabled to ensure that the audio from the at least one speaker propagates in all the possible directions for the audio to be provided to the user. Similarly, when the usage context is that the display apparatus is worn by the user, then the audio from the at least one speaker needs to propagate only in a direction of the user's ears and the audio leakage needs to be cancelled for all other possible directions. Subsequently, the audio leakage cancellation setting is enabled to ensure that the audio from the at least one speaker propagates in only the direction of the user's ears without the audio getting leaked in an outside environment of the user.

Optionally, when the usage context is that the display apparatus is worn by the user, then the audio frequency response is adjusted to the first equalization setting, wherein the "first equalization setting" refers to those changes that are made in the audio frequency response of the audio provided to the user when the display apparatus is worn by the user. For example, the audio frequency response is adjusted to the first equalization setting when the display apparatus is worn by the user, by increasing a bass frequency component of the audio that is provided to the user. Similarly, when the usage context is that the display apparatus is not worn by the user, then the audio frequency response is adjusted to the second equalization setting, wherein the "second equalization setting" refers to those changes that are made in the audio frequency response of the audio provided to the user when the display apparatus is not worn by the user. For example, the audio frequency response is adjusted to the second equalization setting when the display apparatus is not worn by the user, by adjusting a treble frequency component of the audio that is provided to the user.

Optionally, when the usage context indicates the identity of the display apparatus, then the at least one audio parameter needs to be adjusted according to the user's preference, as different users have different preferences regarding how the audio to be provided by the at least one speaker. Subsequently, once the identity of the user of the display apparatus is identified by the usage context, then the user's preference of that identified user is used to set the value of the at least one audio parameter. Optionally, when the usage context is that the display apparatus is connected to the external speakers, then no audio is needed to be provided to the user via the at least one speaker. Subsequently, the audio volume of the at least one speaker is set to zero to ensure that same audio is not provided to the user via two different types of speakers (i.e., the at least one speaker and the external speakers) simultaneously, which adversely affects the user experience. A technical effect is that the at least one processor is able to accurately and effectively adjust the value of the at least one audio parameter based on the usage context, which significantly enhances the user experience.

Optionally, the at least one speaker is integrally attached with the display apparatus such that the at least one speaker is capable of attaining at least one pose with respect to the user's ear, in use, and wherein the at least one processor is further configured to:

detect a current pose of the at least one speaker with respect to the user's ear; and tune the at least one speaker according to the detected current pose.

In this regard, the term "pose" refers to a position and/or an orientation of the at least one speaker with respect to the user's ear. It will be appreciated that the "at least one pose" refers to a "single pose" in some implementations, and a "plurality of poses" in other implementations. Optionally, the at least one pose comprises at least one of: an on-ear pose, an over-ear pose, an open-ear pose, an in-ear pose, a rest pose. In this regard, the term "on-ear pose" refers to that pose in which the at least one speaker is positioned such that the at least one speaker does not completely cover the user's ear. Notably, the on-ear pose of the at least one speaker with respect to the user's ear is also referred to as "supra-aural pose". Throughout the present disclosure, the term "over-ear pose" refers to that pose in which the at least one speaker is positioned such that the at least one speaker completely covers the user's ear. Notably, the over-ear pose of the at least one speaker with respect to the user's ear is also referred to as "circum-aural pose". Throughout the present disclosure, the term "open-ear pose" refers to that pose in which the at least one speaker is positioned such that the at least one speaker does not cover the user's ear, and subsequently, direct the audio towards the user's ear without being in any physical contact with the user's ear. The open-ear pose of the at least one speaker with respect to the user's ear is also referred to as "off-ear pose". Notably, the open-ear pose of the at least one speaker with respect to the user's ear is preferred when the user wants to listen to the ambient noise present in the environment where the display apparatus is used, in addition to the audio provided to the user via the at least one speaker, or when the users wants to have a more light weight and ergonomically more comfortable option in form of the open-ear pose of the at least one speaker in comparison to other poses of the at least one speaker. Throughout the present disclosure, the term "in-ear pose" refers to that pose of the at least one speaker in which the at least one speaker is directly inserted inside an ear-canal of the user's ear. Notably, the in-ear pose of the at least one speaker with respect to the user's ear is also referred to as "insert pose". Throughout the present disclosure, the term "rest pose" refers to that pose of the at least one speaker in which the at least one speaker is directed away from the user's ear, and thus, the at least one speaker do not direct any sound towards the user's ear. Notably, the rest pose of the at least one speaker with respect to the user's ear is used when the at least one speaker is not in use to provide the audio to the user. A technical effect of the at least one pose comprising at least one of: the on-ear pose, the over-ear pose, the open-ear pose, the in-ear pose, the rest pose, is that the at least one speaker is able to effectively change its pose with respect to the user's ear based on requirements of the user which makes the at least one speaker suitable for use in various different implementation scenarios.

Optionally, the at least one speaker is integrally attached with the display apparatus in a way that allows flexibility in movement of the at least one speaker which enables the at least one speaker to attain at least one pose with respect to the user's ear. It will be appreciated that for every different pose from amongst the at least one pose of the at least one speaker, the at least one speaker requires to be tuned differently in order to maintain a consistency in a quality of the audio that is provided to the user. Subsequently, the current pose of the at least one speaker is required to be determined. Throughout the present disclosure, the term "current pose" refers to that pose attained by the at least one speaker with respect to the user's ear at a present moment of time.

Optionally, for detecting the current pose, the at least one processor is configured to:

receive information comprising at least one of: a resonance frequency of the at least one speaker, an acoustic output of the at least one speaker, additional sensor data indicative of a mechanical movement of the at least one speaker, a user input indicative of the current pose; and process the received information to identify the current pose.

In this regard, the term "resonance frequency of the at least one speaker" refers to a natural frequency at which the at least one speaker vibrates to produce sound signals of highest amplitude on being stimulated by a frequency or oscillation. Notably, the resonance frequency of the at least one speaker is different for each of the at least one pose of the at least one speaker, and subsequently, information regarding the resonance frequency of the at least one speaker is indicative of the current pose of the at least one speaker. In an example, the resonance frequency of the at least one speaker is 200 Hertz (Hz) for the on-ear pose of the at least one speaker. In another example, the resonance frequency of the at least one speaker is 500 Hz for the open-ear pose of the at least one speaker. Throughout the present disclosure, the term "acoustic output of the at least one speaker" refers to sound that is produced by the at least one signal upon application of an electrical audio signal. Notably, the acoustic output of the at least one speaker is different for each of the at least one pose of the at least one speaker, and subsequently, information regarding the acoustic output of the at least one speaker is indicative of the current pose of the at least one speaker. Throughout the present disclosure, the term "mechanical movement of the at least one speaker" refers to movement of the at least one speaker from one position and/or orientation to another position and/or orientation. Notably, the at least one speaker needs to perform specific mechanical movement to attain each of the at least one pose, which is sensed in the additional sensor data. Optionally, the additional sensor data is received from a motion sensor arranged in the at least one speaker. Alternatively, the additional sensor data is received from an image sensor of a camera arranged in the environment in which the display apparatus is used. Optionally, the user input may comprises a selection of the current pose by the user to indicate the current pose. Optionally, the user input is received via a user interface arranged in the display apparatus or a user device associated with user. Subsequently, the received information that is indicative of the current pose is processed and analyze to determine the current pose. A technical effect is that the current pose is accurately and effectively determined for the at least one speaker.

Optionally, for tuning the at least one speaker, the at least one processor is configured to perform at least one of:

select, from a plurality of predefined tuning settings for the plurality of poses, a predefined tuning setting that corresponds to the current pose;

adjust a current tuning setting of the at least one speaker based on the current pose to the selected predefined tuning setting that corresponds to the current pose.

In this regard, the term "predefined tuning setting" refers to a given tuning setting to be implemented for a given pose of the at least one speaker. Notably, each different pose of the at least one speaker has a different predefined tuning setting. Optionally, the predefined tuning setting that corresponds to the current pose is selected for tuning the at least one speaker based on the current pose. Throughout the present disclosure, the term "current tuning setting" refers to that tuning setting that is employed for at least one speaker at a current moment of time which is not based on the current pose. Optionally, the current tuning setting of the at least one speaker is adjusted based on the current pose to match the selected predefined tuning setting that corresponds to the current pose, for tuning the at least one speaker. Optionally, the selected predefined tuning setting that corresponds to the current pose is further adjusted to achieve more precise tuning of the at least one speaker. A technical effect is that at least one speaker is accurately and effectively tuned based on the current pose of the at least one speaker, for maintaining the consistency in the quality of audio provided by the at least one speaker from different poses.

Optionally, the display apparatus further comprises a headband configured to be worn on a user's head, wherein the at least one speaker is attached to the headband via at least one attachment means. It will be appreciated that the headband is well-known in the art. Notably, the headband enables the display apparatus to be worn on the user's head. Optionally, the at least one attachment means is at least one of: a screw mount attachment means, a magnetic attachment means, a clip-on attachment means, a rotatable snap-fit attachment means, a spring-loaded clipping or clamping means, a latching means which secures the at least one speaker per ear into a corresponding recess in the headband of the display apparatus, an adhesive, a hook and loop fastener. Optionally, the headband further comprises an ear pad per ear. In this regard, the at least one speaker per ear may be covered by the ear pad. Optionally, the ear pad may be permanently fixed or may be detachably attached to the at least one speaker. A technical effect is that the at least one speaker being attached to the headband via the at least one attachment means enables movement of the at least one speaker to attain different poses which improves ergonomics and quality of the audio for different usage contexts.

The present disclosure also relates to the computer-implemented method as described above. Various embodiments and variants disclosed above, with respect to the aforementioned display apparatus, apply mutatis mutandis to the computer-implemented method.

Optionally, when adjusting the value of the at least one audio parameter for the at least one speaker, based on the usage context, the method further comprises:

setting an audio volume to a first volume lying in a first range, when the usage context is that the display apparatus is worn by a user;

setting the audio volume to a second volume lying in a second range, when the usage context is that the display apparatus is not worn by the user;

disabling the audio leakage cancellation setting, when the usage context is that display apparatus is not worn by the user;

enabling the audio leakage cancellation setting, when the usage context is that display apparatus is worn by the user;

adjusting the audio frequency response according to a first equalization setting, when the usage context is that the display apparatus is worn by the user;

adjusting the audio frequency response according to a second equalization setting, when the usage context is that the display apparatus is not worn by the user;

setting the value of the at least one audio parameter according to a user's preference, when the usage context indicates an identity of the user of the display apparatus;

setting the value of the at least one audio parameter according to a current pose of the at least one speaker with respect to the user's ear, wherein the at least one speaker is capable of attaining at least one pose with respect to the user's ear, when the usage context is that the display apparatus is worn by the user and the usage context indicates a measure of ambient noise in an environment where the display apparatus is used;

setting the audio volume of the at least one speaker to zero, when the usage context is that the display apparatus is connected to external speakers.

Optionally, the at least one speaker is integrally attached with the display apparatus such that the at least one speaker is capable of attaining at least one pose with respect to the user's ear, in use, and wherein the method is further configured to:

detecting a current pose of the at least one speaker with respect to the user's ear; and tuning the at least one speaker according to the detected current pose.

Optionally, for tuning the at least one speaker, the method further comprises:

selecting, from a plurality of predefined tuning settings for the plurality of poses, a predefined tuning setting that corresponds to the current pose; and adjusting a current tuning setting of the at least one speaker based on the current pose to the selected predefined tuning setting that corresponds to the current pose.

DETAILED DESCRIPTION OF THE DRAWINGS

Referring to FIG. 1, illustrated is a schematic illustration of a display apparatus 100, in accordance with an embodiment of the present disclosure. As shown, the display apparatus 100 is worn by a user 102. The display apparatus 100 comprises at least one speaker (depicted as a speaker 104) per ear (depicted as a user's ear 106). Moreover, the display apparatus 100 comprises at least one sensor (depicted as a sensor 108). Furthermore, the display apparatus 100 comprises at least one processor (depicted as a processor 110), wherein the at least one processor 110 is coupled to the at least one speaker 104 and the at least one sensor 108.

Figure 2A:
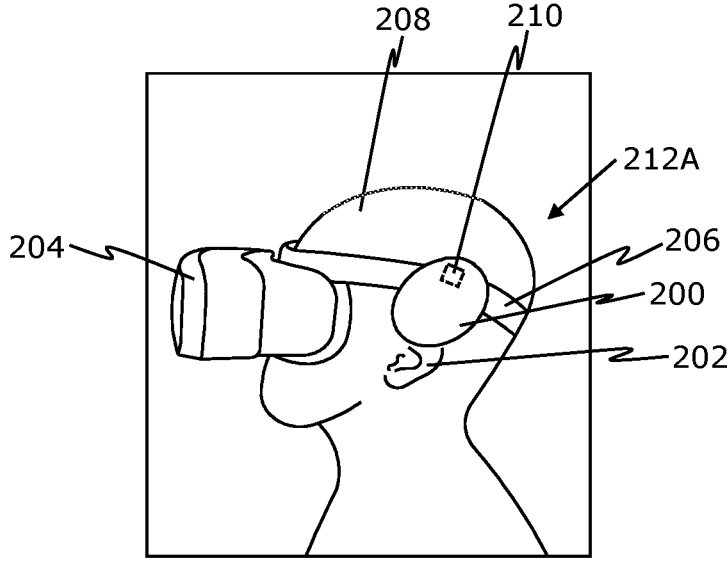
FIGS. 2A-D are schematic illustrations of different poses which at least one speaker is capable of attaining with respect to user's ear, in accordance with an embodiment of the present disclosure.
Figure 2B:
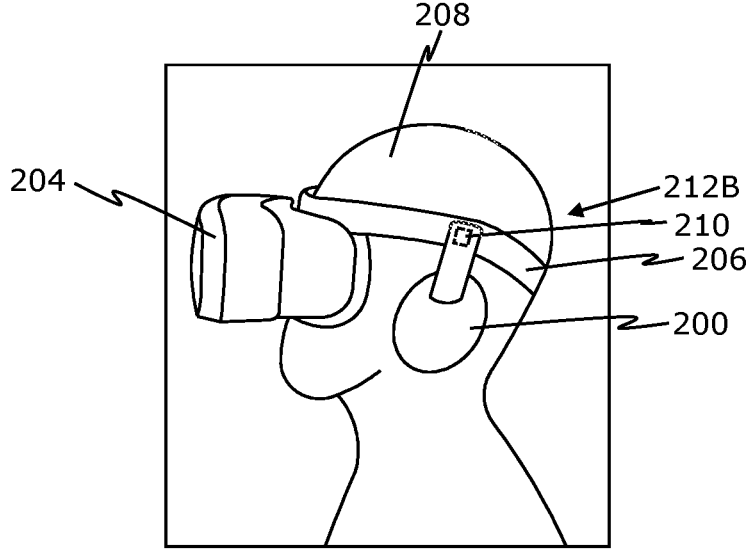
Figure 2C:
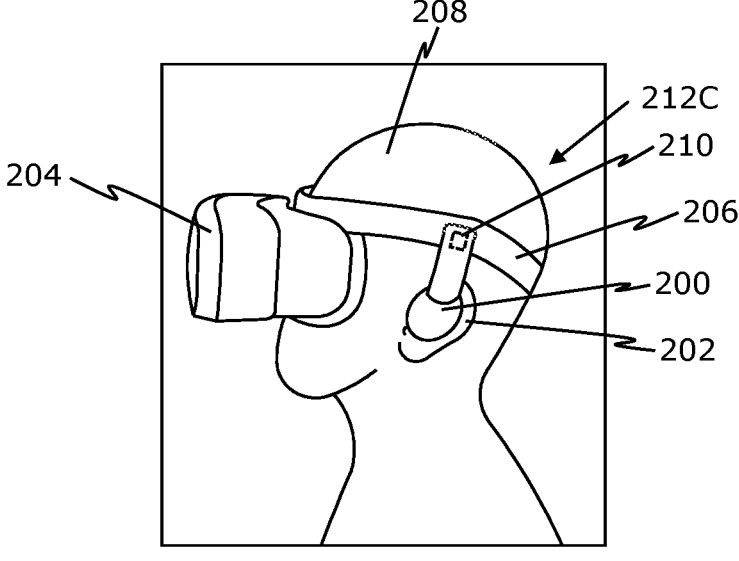
Figure 2D:
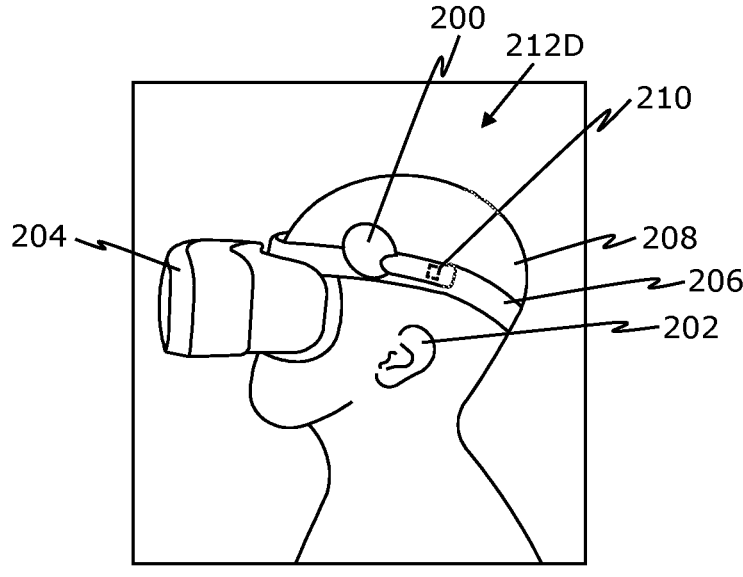

Referring to FIGS. 2A-D, illustrated are schematic illustrations of different poses which at least one speaker (depicted as a speaker 200) is capable of attaining with respect to a user's ear 202 in a display apparatus 204, in accordance with an embodiment of the present disclosure. Herein, the display apparatus 204 is shown to comprise a headband 206 configured to be worn on a user's head 208, wherein the at least one speaker 200 is attached to the headband 206 via at least one attachment means (depicted as an attachment means 210). As shown in FIG. 2A, the at least one speaker 200 attains an open-ear pose 212A with respect to the user's ear 202. As shown in FIG. 2B, the at least one speaker 200 attains an over-ear pose 212B with respect to the user's ear 202. As shown in FIG. 2C, the at least one speaker 200 attains an on-ear pose 212C with respect to the user's ear 202. As shown in FIG. 2D, the at least one speaker 200 attains a rest pose 212D with respect to the user's ear 202.

It may be understood by a person skilled in the art that the FIGS. 2A-2D are merely examples for sake of clarity, which should not unduly limit the scope of the claims herein. The person skilled in the art will recognize many variations, alternatives, and modifications of embodiments of the present disclosure.

Figure 3:
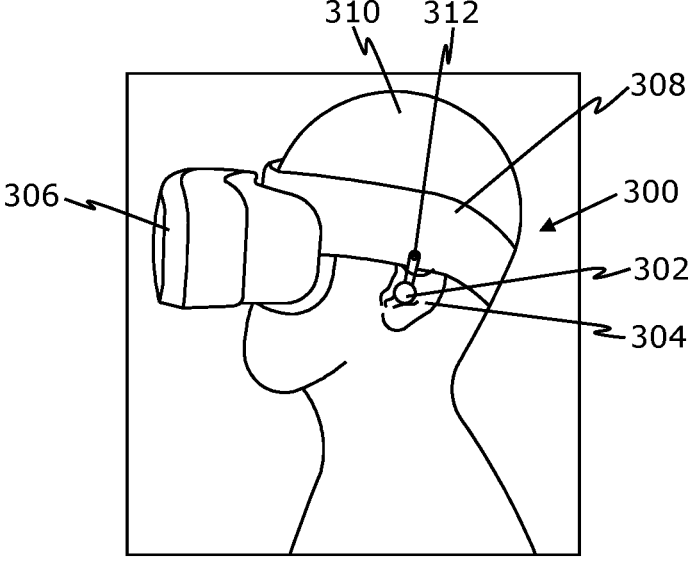
FIG. 3 is a schematic illustration of an in-ear pose which the at least one speaker attains with respect to user's ear, in accordance with an embodiment.
Figure 4:
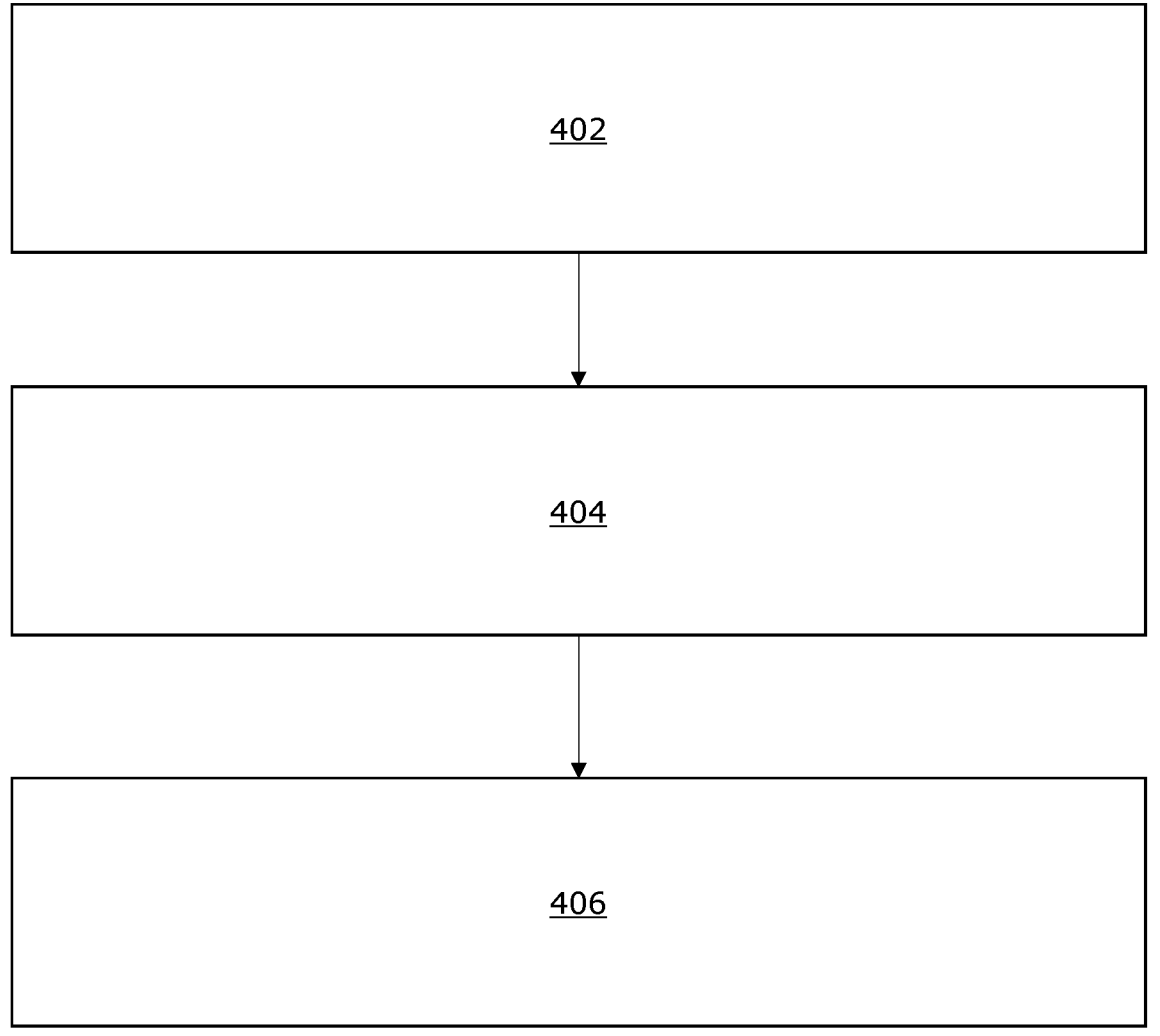
FIG. 4 is an illustration of a flowchart depicting steps of a computer-implemented method, in accordance with an embodiment of the present disclosure.

Referring to FIG. 3, illustrated is a schematic illustration of an in-ear pose 300 which at least one speaker (depicted as a speaker 302) attains with respect to a user's ear 304, in accordance with an embodiment of the present disclosure. As shown, a display apparatus 306 is shown to comprise a headband 308 configured to be worn on a user's head 310, wherein the at least one speaker 302 is attached to the headband 308 via at least one attachment means (depicted as an attachment means 312).

It may be understood by a person skilled in the art that the FIG. 3 is merely an example for sake of clarity, which should not unduly limit the scope of the claims herein. The person skilled in the art will recognize many variations, alternatives, and modifications of embodiments of the present disclosure.

Referring to FIG. 3, illustrated is a flowchart depicting steps of a computer-implemented method, in accordance with an embodiment of the present disclosure. At step 402, sensor data indicative of a usage context of a display apparatus is received, from at least one sensor. At step 404, at least the received sensor data is processed for determining the usage context. At step 406, a value of at least one audio parameter for at least one speaker per ear of the display apparatus is adjusted, based on the determined usage context.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
at least one speaker per ear;
at least one sensor; and
at least one processor coupled to the at least one speaker and the at least one sensor, wherein the at least one processor is configured to:
receive, from the at least one sensor, sensor data indicative of a usage context of the display apparatus;
process at least the received sensor data to determine the usage context; and
adjust a value of at least one audio parameter for the at least one speaker, based on the determined usage context, wherein the at least one speaker is integrally attached with the display apparatus such that the at least one speaker is capable of attaining at least one pose with respect to the ear, and wherein the at least one processor is further configured to:
detect a current pose of the at least one speaker with respect to the ear; and
tune the at least one speaker according to the detected current pose by:
selecting, from a plurality of predefined tuning settings for the at least one pose, a predefined tuning setting that corresponds to the detected current pose; and
adjusting a current tuning setting of the at least one speaker to the selected predefined tuning setting that corresponds to the detected current pose by:
selecting, from a plurality of predefined tuning settings for the at least one pose, a predefined tuning setting that corresponds to the detected current pose; and
adjusting a current tuning setting of the at least one speaker to the selected predefined tuning setting that corresponds to the detected current pose.

2. The display apparatus of claim 1, wherein the at least one sensor comprises at least one of: a face tracking means, an eye tracking means, a proximity sensor, a display apparatus-tracking means, a biometric authentication means, a microphone, a peripheral connectivity sensor.

3. The display apparatus of claim 1, wherein the usage context is at least one of: whether or not the display apparatus is worn by a user, whether or not the display apparatus is stationary, an identity of the user of the display apparatus, a measure of ambient noise in an environment where the display apparatus is used, whether or not the display apparatus is connected to external speakers.

4. The display apparatus of claim 1, wherein the at least one audio parameter is at least one of: an audio volume, an audio frequency response, an audio leakage cancellation setting, an audio channel balance, an audio profile, an audio filtering setting, a hearing impairment correction setting, an audio phase setting.

5. The display apparatus of claim 1, wherein when adjusting the value of the at least one audio parameter for the at least one speaker, based on the usage context, the at least processor is configured to perform at least one of:
set an audio volume to a first volume lying in a first range, when the usage context is that the display apparatus is worn by the user;
set the audio volume to a second volume lying in a second range, when the usage context is that the display apparatus is not worn by the user;
disable the audio leakage cancellation setting, when the usage context is that display apparatus is not worn by the user;
enable the audio leakage cancellation setting, when the usage context is that display apparatus is worn by the user;
adjust the audio frequency response according to a first equalization setting, when the usage context is that the display apparatus is worn by the user;
adjust the audio frequency response according to a second equalization setting, when the usage context is that the display apparatus is not worn by the user;
set the value of the at least one audio parameter according to a user's preference, when the usage context indicates the identity of the user of the display apparatus;
set the value of the at least one audio parameter according to a current pose of the at least one speaker with respect to the user's ear, wherein the at least one speaker is capable of attaining at least one pose with respect to the user's ear, when the usage context is that the display apparatus is worn by the user and the usage context indicates a measure of ambient noise in an environment where the display apparatus is used; and set the audio volume of the at least one speaker to zero, when the usage context is that the display apparatus is connected to external speakers.

6. The display apparatus of claim 1, wherein the at least one processor is further configured to: receive a user input indicative of the usage context; and process the received user input to determine the usage context.

7. The display apparatus of claim 1, wherein the at least one pose comprises at least one of: an on-ear pose, an over-ear pose, an open-ear pose, an in-ear pose, a rest pose.

8. The display apparatus of claim 1, wherein for detecting the current pose, the at least one processor is configured to: receive information comprising at least one of: a resonance frequency of the at least one speaker, an acoustic output of the at least one speaker, additional sensor data indicative of a mechanical movement of the at least one speaker, a user input indicative of the current pose; and process the received information to identify the current pose.

9. The display apparatus of claim 1, further comprising a headband configured to be worn on a user's head, wherein the at least one speaker is attached to the headband via at least one attachment means.

10. The display apparatus according to claim 1, wherein the processor is configured to set the value of the at least one audio parameter according to the current pose of the at least one speaker with respect to an ear of a user, when the usage context is that the display apparatus is worn by the user and the usage context indicates a measure of ambient noise in an environment where the display apparatus is used.

11. A computer-implemented method comprising:

receiving, from at least one sensor, sensor data indicative of a usage context of a display apparatus;

processing at least the received sensor data for determining the usage context; and adjusting a value of at least one audio parameter for at least one speaker per ear of the display apparatus, based on the determined usage context, wherein the at least one speaker is integrally attached with the display apparatus such that the at least one speaker is capable of attaining at least one pose with respect to the ear, and wherein the at least one processor is further configured to:

detect a current pose of the at least one speaker with respect to the ear; and tune the at least one speaker according to the detected current pose by:

selecting, from a plurality of predefined tuning settings for the at least one pose, a predefined tuning setting that corresponds to the detected current pose; and adjusting a current tuning setting of the at least one speaker to the selected predefined tuning setting that corresponds to the current pose.

12. The computer-implemented method of claim 11, wherein when adjusting the value of the at least one audio parameter for the at least one speaker, based on the usage context, the method further comprises:

setting an audio volume to a first volume in a first range, when the usage context is that the display apparatus is worn by a user;

setting the audio volume to a second volume in a second range, when the usage context is that the display apparatus is not worn by the user;

disabling the audio leakage cancellation setting, when the usage context is that display apparatus is not worn by the user;

enabling the audio leakage cancellation setting, when the usage context is that display apparatus is worn by the user;

adjusting the audio frequency response according to a first equalization setting, when the usage context is that the display apparatus is worn by the user;

adjusting the audio frequency response according to a second equalization setting, when the usage context is that the display apparatus is not worn by the user;

setting the value of the at least one audio parameter according to a user's preference, when the usage context indicates an identity of the user of the display apparatus;

setting the value of the at least one audio parameter according to a current pose of the at least one speaker with respect to the user's ear, wherein the at least one speaker is capable of attaining at least one pose with respect to the user's ear, when the usage context is that the display apparatus is worn by the user and the usage context indicates a measure of ambient noise in an environment where the display apparatus is used; and setting the audio volume of the at least one speaker to zero, when the usage context is that the display apparatus is connected to external speakers.

13. The computer-implemented method according to claim 11, comprising, when adjusting the value of the at least one audio parameter for the at least one speaker, setting the value of the at least one audio parameter according to thea current pose of the at least one speaker with respect to the ear of the user, when the usage context is that the display apparatus is worn by the user and the usage context indicates a measure of ambient noise in an environment where the display apparatus is used.

* * * * *